July 12, 1960
T. S. HARKNESS
2,944,462
CINEMATOGRAPH SCREENS
Filed Sept. 28, 1959
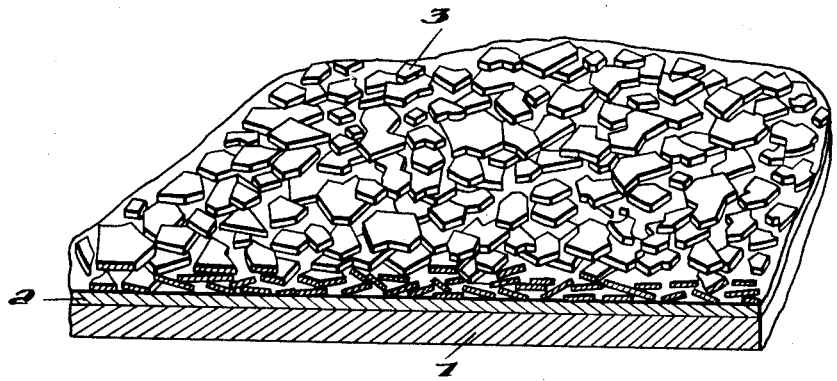
INVENTOR
Thomas Smith Harkness,
BY Pierce, Scheffler & Parker
His ATTORNEYS

United States Patent Office 2,944,462
Patented July 12, 1960

---

2,944,462

CINEMATOGRAPH SCREENS

Thomas Smith Harkness, London, England, assignor to Andrew Smith Harkness Limited, London, England, a company of Great Britain Filed Sept. 28, 1959, Ser. No. 842,739

5 Claims. (Cl. 88—28.9)

This invention relates to cinematograph screens of the kind having a base made, for example, of a fabric or a synthetic plastic material and provided with a coating or coatings to give the desired final screen surface.

Such screens coated with an aluminum paint or with minute glass beads have a high reflectivity factor which, however, falls off rather rapidly when the viewing angle becomes at all wide and under these latter circumstances an aluminum coated screen takes on a somewhat leaden appearance.

It is an object of this invention to provide a cinematograph screen which has an improved surface giving greater reflectivity than heretofore obtainable and, at the same time, with substantially the same reflectivity over a wide viewing angle.

It is a further object of the invention to provide such a screen with a surface layer composed of a dispersion, in a substantially transparent and colorless lacquer, of water-insoluble, inorganic, transparent, platelike crystals having high refraction and giving multiple reflection, which surface layer is disposed over a white diffuse reflecting surface on the screen base. The projection screen of the invention is characterized by three cooperating contributions: (1) the reflection of light from surfaces of the crystals; (2) the refraction and multiple reflection of light in and by the crystals; and (3) the diffuse reflection of light from the white surface provided back of, and adjacent to, the crystals-containing surface layer.

These and other objects and advantages of the invention will be apparent from the accompanying drawing, in which the single figure is an enlarged, vertical sectional view, in perspective, of the screen, and from the following description, now to be given by way of example, of the manner of carrying it into effect.

In practicing the invention, a screen is made with a base 1 from a single sheet or from a plurality of strips of a suitable material, such as a fabric or a synthetic plastic of the polyvinylchloride type. In the latter case it is convenient to form the screen base from a plurality of sheets of thermoplastic polyvinylchloride joined together, edge to edge, by means of a double weld in which a first weld is made adjacent to the edges of two superposed sheets thereby fusing the upper sheet to the lower sheet, removing the edge parts beyond the weld, and then making a second weld over the opened out sheets whereby the ridge of the first weld is pressed into the groove of the opened out sheets resulting in a fusion of both sheets into one sheet of even thickness with a smooth and almost invisible join.

For relatively small sized screens, say those under 20 yards width, it is convenient to use plastic material having a thickness of 0.012 inch but for wider screens plastic material with a thickness of 0.018 inch is preferable.

It is preferred to use a white base material for the screen. The desired white surface may be provided by pigmenting the base material itself, or by providing on one surface of the screen base a layer of white coating composition. To obtain the best results the screen base 1, when fabricated, is hung from a frame or otherwise suitably mounted and then coated with a white pigmented lacquer consisting of approximately 5% titanium dioxide mixed in a binder lacquer of polyvinylchloride and copolymerized vinylacetate. In the case of sheeted plastic material as the screen base, it is convenient to pigment the plastic itself with a white pigment. The white pigment preferably is titanium dioxide, but may be zinc oxide, magnesium oxide or aluminum oxide.

The pigmented lacquer forms a coating 2 on the screen base 1 and this coating 2 is approximately 10 microns thick. The coating 2 is then covered with a further coating 3, actually made up of several overlapping coatings, of a "paint" comprising a lacquer, which is transparent and substantially colorless, to which has been added a transparent crystalline ingredient having a high refraction and high reflecting power. To obtain the best results the crystalline ingredient chosen must be of lamellar or plate-like form.

A screen surface coated with such a paint is white and lustrous, even when viewed at a wide viewing angle, and has been measured to give an increased reflectivity of up to 25% over an aluminum coated screen under the same conditions.

Specifically, it has been found that a suitable ingredient is basic lead carbonate, in the form of thin plate-like crystals and with the formula $3PbCO_3, 2Pb(OH)_2$.

Basic lead carbonate can be obtained in the form of thin, transparent plate-like crystals with a high index of refraction of about 2 and it is stable up to approximately 400° C., which is a sufficiently wide temperature range for all practical purposes. The crystals are grown artificially in various sizes and are mostly hexagonal and of plate shape. They are very thin, varying from about 0.03 micron to as much as 1 micron thickness and have a diameter of several microns, e.g., at least 3 microns and usually averaging 5–6 microns but a conglomeration of adjacent crystals can take place which then forms plates of about the same thickness but up to 20 microns in diameter. The crystals are insoluble in water and most other liquids, including the aforesaid lacquer compositions, and thus highly suitable for use as the crystalline ingredient in the lacquer in accordance with the present invention.

Immediately after the crystals have been produced they are, without substantial access to air, mixed into a substantially colorless lacquer; preferably, they are immediately dispersed in a nitrocellulose solution together with butyl acetate in the proportions by weight of about 35% basic lead carbonate crystals, 10% nitrocellulose solution and 55% butyl acetate. While a nitrocellulose lacquer is preferred, the freshly produced plate-like crystals may be protected from air by dispersing them in another suitable, substantially colorless and transparent lacquer such, for instance, as a known lacquer comprising a solution of ethyl cellulose or a solution of polyvinyl chloride.

This mixing should be effected immediately after the crystals have been produced as this enables them to be evenly distributed, as otherwise they cling together. The prompt mixing also insures, at the same time, that the crystals are protected, by the lacquer in which they are dispersed, against action thereon by air and against formation of air layers against their surfaces.

In preparing the paint for coating the screen base material, over the white pigment surface, or white pigment surface coating, the mixture of crystals, nitrocellulose and butyl acetate is mixed into a transparent, substantially colorless polyvinyl lacquer prepared by taking 92% by weight of polyvinylchloride solids and 8% by weight copolymerized vinylacetate solids and dispersing them in known manner in methyl ethyl butyl toluene or any other suitable mixture of ketones and aromatic hydrocarbons to obtain a sprayable lacquer.

Approximately 1½ lbs. by weight of the aforesaid lead carbonate crystals-nitrocellulose solution-butyl acetate mixture is mixed into approximately 7½ lbs. by weight of the polyvinyl lacquer and the resulting paint, obtained in these proportions, is then used for coating the surface of the screen over the white pigment coating 2. The paint coating, shown at 3 on the drawing, is actually made up of several overlapping coatings and the finished surface layer of coating 3 is of from about 20 to about 25 microns in thickness. The individual coatings are applied in any suitable manner, the most convenient way being by means of an automatic spraying apparatus, especially with screens of large size. In lieu of spraying, the "paint" may be applied to the white-surfaced base sheet by known roller coating, or knife coating, procedures.

While pure basic lead carbonate in crystalline form may be used as the crystalline ingredient in the paint in some cases it is advantageous to admix it with other inorganic or organic crystals.

As is attempted to be illustrated in the drawing, the final surface coating layer shows an array of the lamellar basic lead carbonate crystals in overlapping, chaotic disposition, the greater part of the crystals lying parallel to the surface of the base and others standing at a variety of different small angles with respect to the base. This arrangement of the aforesaid lamellar crystals—which is favored by the mode of application of the fluid suspension in a plurality of successively applied spray coatings—is believed to account, at least in part, for the unique property (of the screen) of exhibiting substantially the same high reflectivity over a wide viewing angle.

As has been indicated above, light projected against the viewing face of the screen of the present invention is, in part, reflected from surfaces of the plate-like crystals, while part of the light is refracted and reflected in and by the crystals. The substantial portion, of the total light, which is transmitted through the crystals-containing layer is reflected by the white diffuse reflection surface beneath said layer, thereby contributing to the sum total of light from the screen. The protection of the platelike crystals ensures a consistent level of reflection (from the viewing surface of the screen) over a long period of time, and the highest total reflectivity is obtained by the provision of the above-described crystals-containing surface layer over a white surfaced screen base. In this connection, it is noted that plate-like crystals substantially smaller than 3 microns in diameter, e.g., 2 microns or under, are inoperable to act as reflecting mirror plates in the surface layer, and tend merely to scatter the light. Colored (e.g. yellowish) light-reflecting elements normally are undesirable in the surface layer, because they depreciate the desired whiteness of the screen.

This application contains subject-matter in common with my application Serial No. 607,357, filed August 31, 1956, "Cinematograph Screens," now abandoned, and is a continuation-in-part of the latter.

I claim:

1. Projection screen comprising a screen base of sheet material having a white diffuse reflecting surface and an outer reflecting layer of crystals embedded in a carrier material lying over said surface, characterized in that the crystals consist essentially of transparent hexagonal basic lead carbonate crystals having high reflecting power and a refractive index of about 2 and are in the form of small thin plates having a major dimension of at least several microns, and in that these plates are disposed in the carrier material preponderantly parallel and at small angles to the viewing surface, further characterized in that light impinging upon said white surface through said crystals and reflected by said white surface is refracted by said crystals and combines with the light reflected by the upper surface of the crystal layer to give an increased reflectivity over a wide viewing angle, said screen when viewed at an acute viewing angle having an increased total reflectivity of up to 25% compared with an aluminum coated screen.

2. A projection screen as defined in claim 1, in which said white surface comprises titanium dioxide.

3. Projection screen as defined in claim 1, in which the white diffuse reflecting surface is provided by a primary layer of a white pigmented lacquer composition carried on the screen base.

4. Projection screen as defined in claim 1, in which the carrier material is a substantially colorless lacquer.

5. Projection screen as defined in claim 1, in which the screen base is composed of a plurality of strips of unsupported sheeted plastic material joined edge-to-edge by a substantially seamless fusion joint having the same thickness and the same optical reflecting quality as that of the total screen area.

References Cited in the file of this patent

UNITED STATES PATENTS

| | | |
|---|---|---|
| 2,002,733 | Earle | May 28, 1935 |
| 2,097,269 | Brossman | Oct. 26, 1937 |

OTHER REFERENCES

"Highways Glisten With Deep Sea Lusters," Automotive Industries, March 5, 1932, Geschelin.

"Pearlescent Lead Pigments," Lead, vol. 23, No. 1, pages 5 and 6, rec. July 28, 1959.